(12) United States Patent
Chen

(10) Patent No.: US 7,106,578 B2
(45) Date of Patent: Sep. 12, 2006

(54) DISPLAY DEVICE

(75) Inventor: Ching-Wen Chen, Taoyuan Hsien (TW)

(73) Assignee: Hannspree Inc., Taipei (TW)

( * ) Notice: Subject to any disclaimer, the term of this patent is extended or adjusted under 35 U.S.C. 154(b) by 0 days.

(21) Appl. No.: 11/018,820

(22) Filed: Dec. 21, 2004

(65) Prior Publication Data

US 2006/0082957 A1    Apr. 20, 2006

(30) Foreign Application Priority Data

Oct. 15, 2004    (TW) ............................... 93216415 U

(51) Int. Cl.
*G06F 1/16* (2006.01)
(52) U.S. Cl. ...................... 361/681; 248/917; D14/345
(58) Field of Classification Search ................ 361/681, 361/683; 248/917–921; D14/345
See application file for complete search history.

(56) References Cited

U.S. PATENT DOCUMENTS

| 5,128,829 | A | * | 7/1992 | Loew | ........................ 361/683 |
|---|---|---|---|---|---|
| 5,396,399 | A | * | 3/1995 | Blair et al. | .................. 361/681 |
| 5,682,182 | A | * | 10/1997 | Tsubosaka | ................... 345/173 |
| 5,737,183 | A | * | 4/1998 | Kobayashi et al. | ......... 361/683 |
| 5,796,575 | A | * | 8/1998 | Podwalny et al. | .......... 361/681 |
| 6,034,866 | A | * | 3/2000 | Nobuchi et al. | ............ 361/681 |
| D432,099 | S | * | 10/2000 | Loh et al. | .................. D14/345 |
| D451,507 | S | * | 12/2001 | Lin | ........................... D14/345 |
| 6,606,762 | B1 | * | 8/2003 | Levine et al. | ............... 361/681 |
| 6,665,176 | B1 | * | 12/2003 | Amemiya et al. | .......... 361/681 |
| 6,781,824 | B1 | * | 8/2004 | Krieger et al. | ............. 361/683 |
| 6,819,549 | B1 | * | 11/2004 | Lammers-Meis et al. | ... 361/681 |

* cited by examiner

*Primary Examiner*—Lisa Lea-Edmonds
(74) *Attorney, Agent, or Firm*—Thomas, Kayden, Horstemeyer & Risley

(57) ABSTRACT

A display device. A display device comprises a body and a movable portion. The body comprises a display panel. The movable portion is rotatably disposed on the body, movable between a first position and a second position. When the movable portion is at the first position, the movable portion is closed on the body, covering and protecting the display panel. When the movable portion rotates a predetermined angle from the first position to the second position, the movable portion becomes a supporting member, to support the body in an upright position.

13 Claims, 4 Drawing Sheets

DISPLAY DEVICE

BACKGROUND

The invention relates to display devices, and in particular to display devices with a movable portion, acting as a cover and a supporting member.

Display devices, such as TVs, liquid crystal displays, and notebook screens, have become thin and light due to innovation. Not only are size and quality required, convenience and delicate appearance are also important for customers.

A liquid crystal display, for example, is often used in an office or home work area. Some users may like to move the display to any place he or she likes. Since the conventional display is heavy and fragile, it is not well suited to use as a mobile device. Thus, it is may be inconvenient for most users to carry when traveling. Additionally, the conventional display does not have any protection against damage due to collision during transport.

SUMMARY

Display devices are provided. An exemplary embodiment of a display device comprises a body and a movable portion. The body comprises a display panel. The movable portion is rotatably disposed on the body, movable between a first position and a second position. When the movable portion is at the first position, the movable portion is closed on the body, covering and protecting the display panel. When the movable portion rotates a predetermined angle from the first position to the second position, the movable portion becomes a supporting member, supporting the body in an upright position.

The movable portion further comprises a handle, disposed on a top thereof.

The display device comprises a connecting device, connecting the body and the movable portion.

The connecting device comprises a shaft and a connecting portion. The connecting portion comprises a protrusion disposed thereon for positioning the movable portion at the first position and the second position, and the movable portion is rotatable within the predetermined angle. The shaft is an oil-hydraulic press shaft.

The predetermined angle is substantially between 0° and 350°, 0° and 330°, or 0° and 300°.

The movable portion comprises transparent materials.

The movable portion can comprise opaque materials.

The display device comprises a liquid crystal display (LCD), a TV, a plasma display panel (PDP), or an organic light emitting display (OLED).

DESCRIPTION OF THE DRAWINGS

Display devices can be more fully understood by reading the subsequent detailed description in conjunction with the examples and references made to the accompanying drawings, wherein.

DETAILED DESCRIPTION

Display devices are provided. An embodiment of a display device is described in the following. A liquid crystal display is given as an example of the invention. The embodiment can be applicable in other types of display devices such as TVs, plasma display panels (PDPs), organic light emitting displays (OLEDs), and others.

Figure 1:
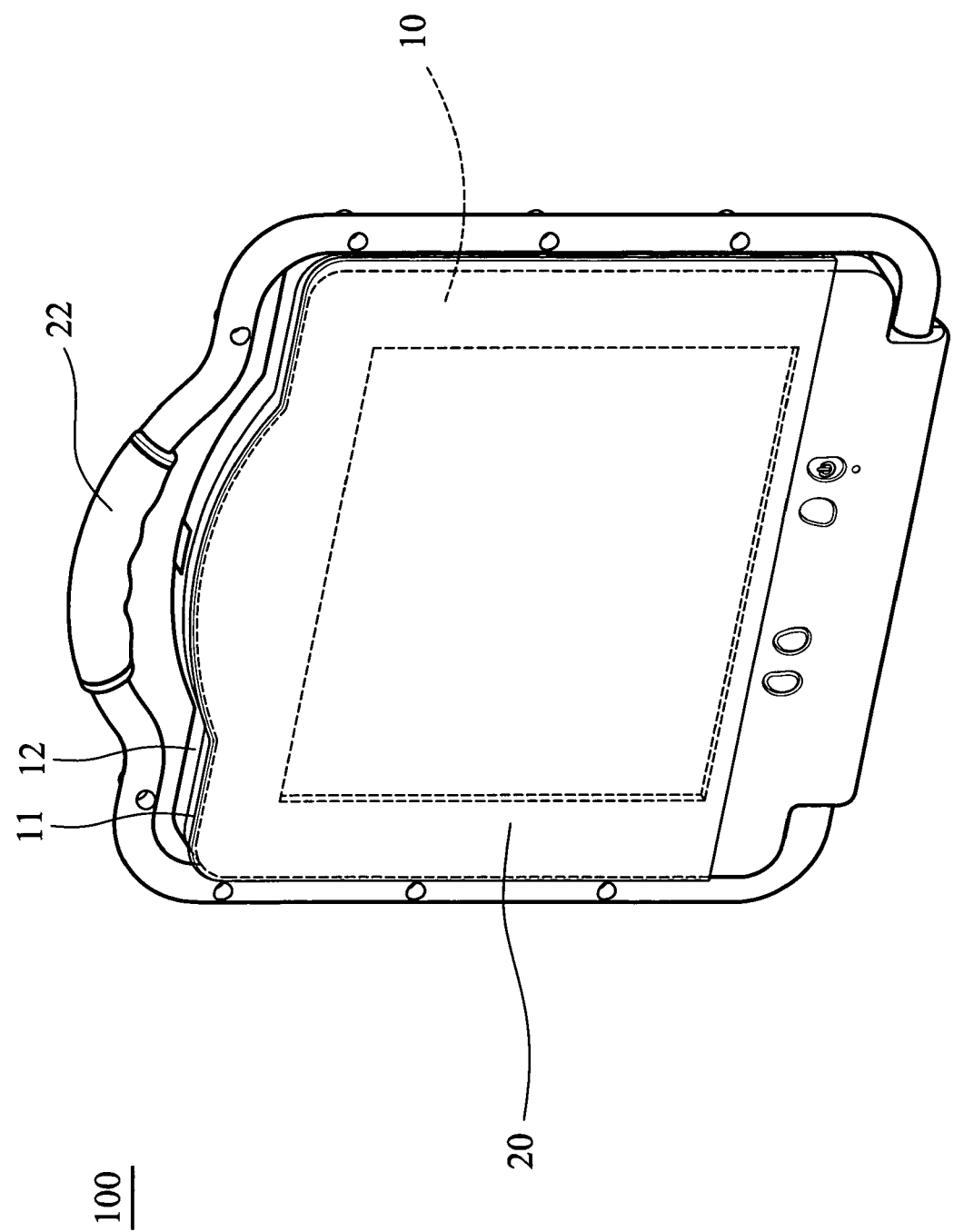
FIG. 1 is a schematic perspective view of an embodiment of a display device at a first position.
Figure 2:
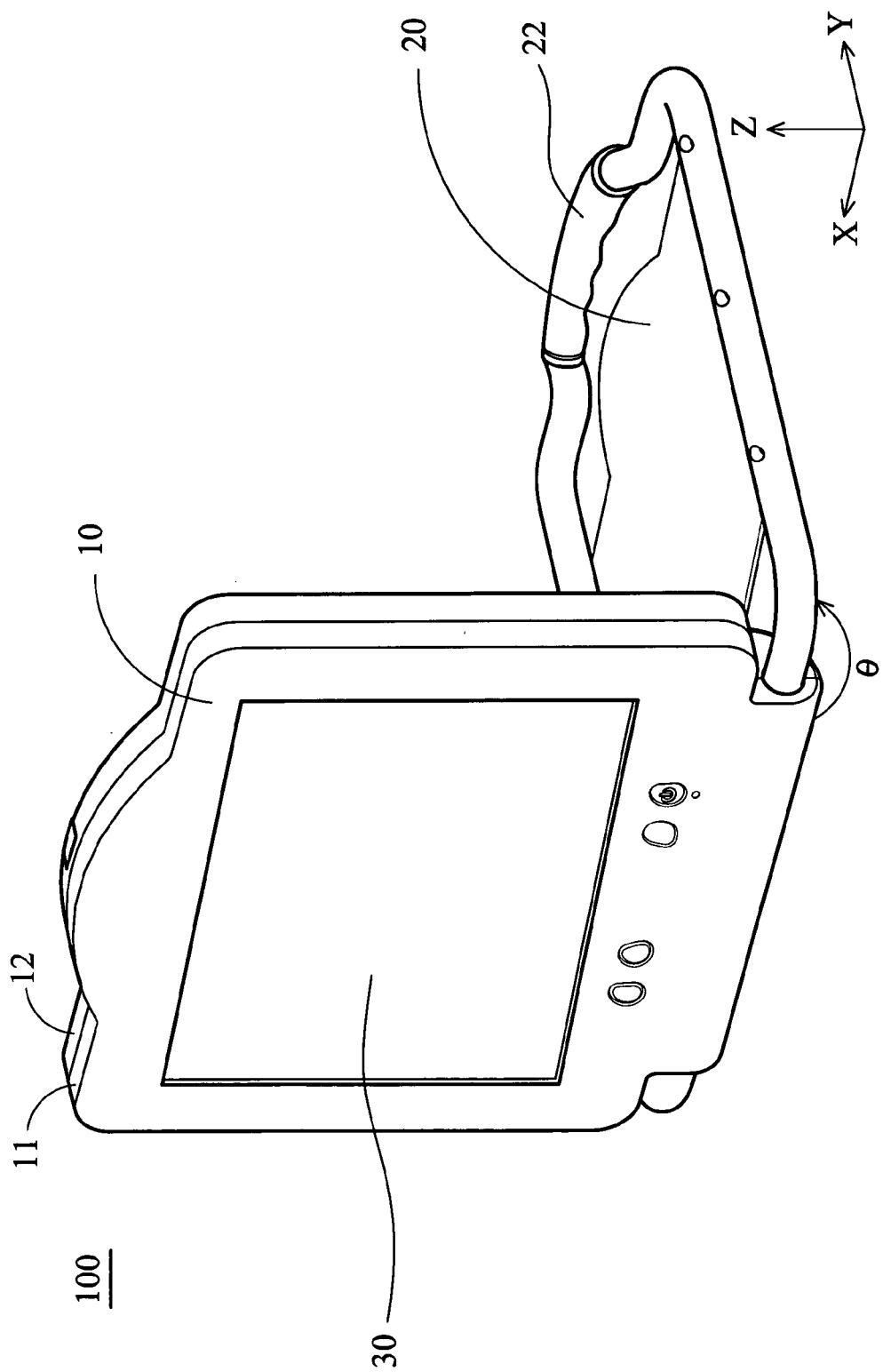
FIG. 2 is a schematic perspective view of an embodiment of a display device at a second position.

FIG. 1 is a schematic perspective view of an embodiment of the liquid crystal display 100 at a first position. FIG. 2 is a schematic perspective view of an embodiment of the liquid crystal display 100 at a second position.

The liquid crystal display 100 comprises a body 10 and a movable portion 20. The body 10 comprises a first cover 11, a second cover 12, and a display panel 30. The display panel 30 is disposed between the first cover 11 and the second cover 12. The movable portion 20 is rotatably disposed on the body 10, movable between a first position (FIG. 1) and a second position (FIG. 2). When the movable portion 20 is at the first position, the movable portion 20 is closed on the body 10, covering and protecting the display panel 30. The movable portion 20 further comprises a handle 22, disposed on a top thereof, such that when the movable portion 20 is at the first position, users can hold the liquid crystal display 100 via the handle 22 for outdoor use.

Moreover, the movable portion 20 can comprise transparent or opaque materials. When the movable portion 20 is transparent, when closed on the body 10, images can be viewed without opening the movable portion 20. Additionally, the movable portion 20 can be opaque and designed with various patterns thereon, becoming a decorative and protective cover when not in use.

As shown in FIG. 2, when the movable portion 20 rotates a predetermined angle θ from the first position to the second position, the movable portion 20 serves as a supporting member or a base, to support the body 10 in an upright position on an XY plane.

Figure 3:
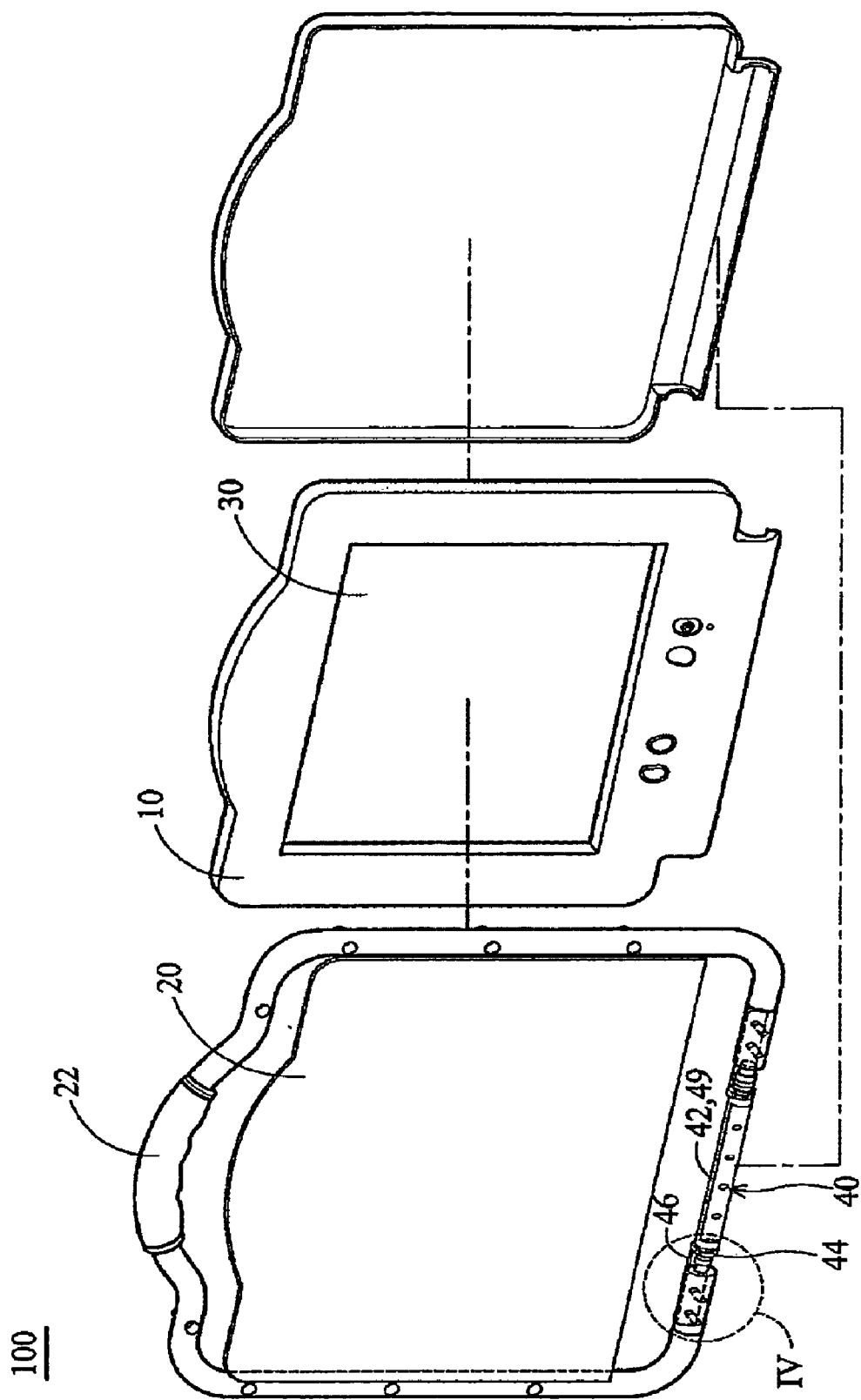
FIG. 3 is a schematic exploded view of a body and a movable portion of a display device.

FIG. 3 is a schematic exploded view of the body 10 and the movable portion 20 of the liquid crystal display 100. The liquid crystal display 100 comprises a connecting device 40, connecting the body 10 and the movable portion 20 such that the movable portion 20 can rotate toward the rear side thereof at the predetermined angle θ.

Figure 4:
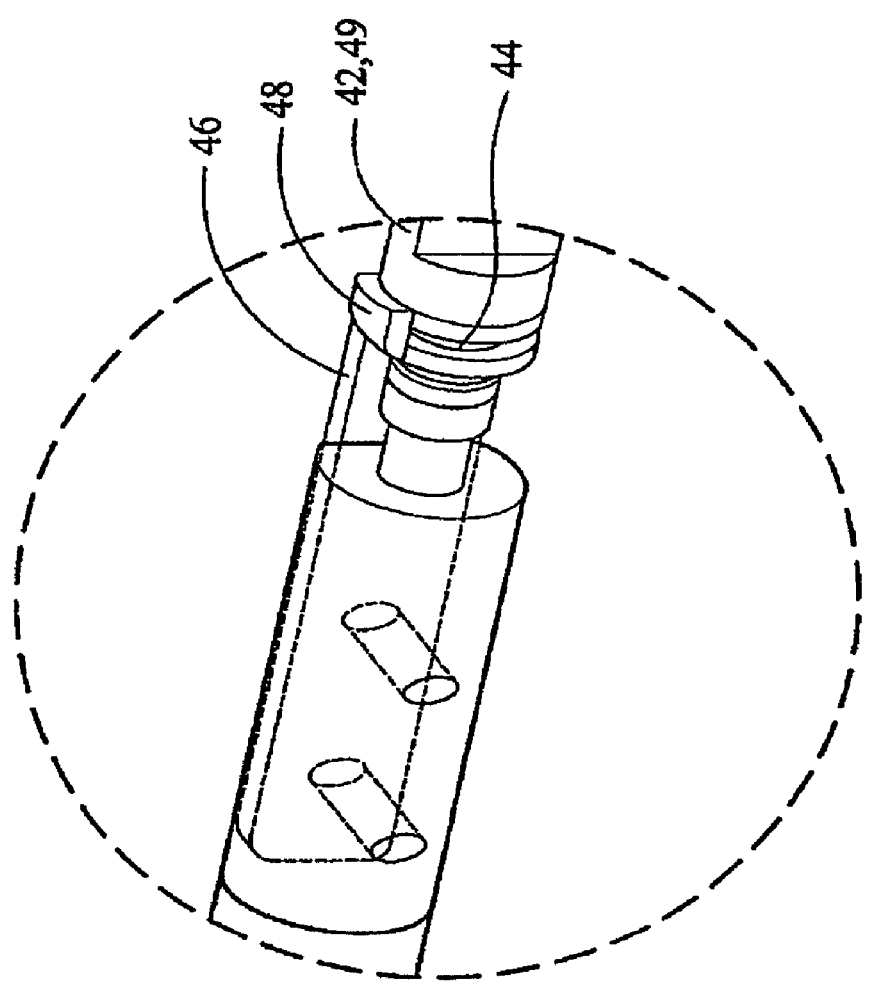
FIG. 4 is a local enlarged view of a portion IV of FIG. 3.

FIG. 4 is a local enlarged view of a portion IV of FIG. 3. In detail, the connecting device 40 can comprise a shaft 42, a pair of washers 44, and a pair of connecting portions 46. As shown again in FIG. 3, the shaft 42 can be connected to the body 10 via screws. The shaft 42 can be an oil-hydraulic press shaft 49, controlling rotational speed of the movable portion 20. As shown in FIG. 4, the connecting portion 46 is abutted at two ends of the shaft 42 via the washers 44 to connect the movable portion 20 and the shaft 42. The connecting portion 46 comprises a protrusion 48 disposed thereon for positioning the movable portion 20 at the first position and the second position such that the movable portion 20 is rotatable within the predetermined angle θ, as shown in FIG. 2. Note that the embodiment is limited to the position of the protrusion 48, and can vary according to different designs.

The predetermined angle θ is substantially between 0° and 350°, 0° and 330°, or 0° and 300°.

Hence, the movable portion of the display device can be a cover or a base, convenient for carrying outdoors, saving space, and protecting the panel of the display device.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. A display device, comprising:
   a body, comprising a display panel;
   a movable portion, rotatably disposed on the body, movable between a first position and a second position; wherein, when the movable portion is at the first position, the movable portion is closed on the body, covering and protecting the display panel; when the movable portion rotates a predetermined angle from the first position to the second position, the movable portion becomes a supporting member, to support the body in an upright position; and
   a connecting device, comprising a shaft and a connecting portion, connecting to the body and butt jointing the movable portion;
   wherein the connecting portion comprises a protrusion disposed thereon for positioning the movable portion at the first position and the second position, and the movable portion is rotatable within the predetermined angle; and
   the shaft is an oil-hydraulic press shaft.

2. The display device as in claim 1, wherein the movable portion further comprises a handle, disposed on a top thereof.

3. The display device as in claim 1, wherein the predetermined angle is substantially between 0° and 350°.

4. The display device as in claim 1, wherein the predetermined angle is substantially between 0° and 330°.

5. The display device as in claim 1, wherein the predetermined angle is substantially between 0° and 300°.

6. The display device as in claim 1, wherein the movable portion comprises transparent materials.

7. The display device as in claim 1, wherein the movable portion comprises opaque materials.

8. The display device as in claim 1, wherein the display device comprises a liquid crystal display.

9. The display device as in claim 1, wherein the display device comprises a television.

10. The display device as in claim 1, wherein the display device comprises a plasma display panel.

11. The display device as claimed in claim 1, wherein the display device comprises an organic light emitting display.

12. A display device, comprising:
    a body, comprising a display panel;
    a movable portion, rotatably disposed on the body, movable between a first position and a second position; wherein, when the movable portion is at the first position, the movable portion is closed on the body, covering and protecting the display panel; when the movable portion rotates a predetermined angle from the first position to the second position, the movable portion becomes a supporting member, to support the body in an upright position; and
    a single connecting device, comprising a shaft and a connecting portion, connecting the body and the movable portion;
    wherein the connecting portion comprises a protrusion disposed thereon for positioning the movable portion at the first position and the second position, and the movable portion is rotatable within the predetermined angle.

13. The display device as in claim 12, wherein the shaft is an oil-hydraulic press shaft.

* * * * *